United States Patent
Gailloux et al.

(10) Patent No.: US 10,291,498 B1
(45) Date of Patent: May 14, 2019

(54) MOBILE COMMUNICATION DEVICE DIAGNOSTIC CLIENT AND ERROR REMEDIATION SHARING

(71) Applicant: Sprint Communications Company L.P., Overland Park, KS (US)

(72) Inventors: Michael A. Gailloux, Overland Park, KS (US); Brian A. Gavin, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/812,634

(22) Filed: Nov. 14, 2017

(51) Int. Cl.
  *H04W 4/50* (2018.01)
  *H04L 12/24* (2006.01)
  *H04L 12/26* (2006.01)
  *H04W 24/08* (2009.01)

(52) U.S. Cl.
  CPC ........ *H04L 43/065* (2013.01); *H04L 43/0811* (2013.01); *H04W 24/08* (2013.01); *H04L 41/5061* (2013.01); *H04W 4/50* (2018.02)

(58) Field of Classification Search
  CPC ............... H04L 43/065; H04L 43/0811; H04L 41/5061; H04W 24/08; H04W 4/50
  See application file for complete search history.

(56) References Cited

U.S. PATENT DOCUMENTS

| | | | | |
|---|---|---|---|---|
| 6,801,756 | B1 * | 10/2004 | Agrawal | H04L 41/0681 370/280 |
| 8,249,582 | B1 * | 8/2012 | Abou-El-Ella | H04L 41/5054 455/412.2 |
| 8,320,904 | B1 * | 11/2012 | Celentano | H04W 24/08 455/423 |
| 8,644,813 | B1 * | 2/2014 | Gailloux | H04W 24/08 455/115.1 |
| 8,700,030 | B1 | 4/2014 | Cole et al. | |

(Continued)

OTHER PUBLICATIONS

Andreas, Paul M. "Systems and Methods for On-Device Adaptive Self-Executing Diagnostics Tool," filed on Feb. 21, 2017, U.S. Appl. No. 15/438,753.

(Continued)

*Primary Examiner* — Babar Sarwar

(57) ABSTRACT

A method of diagnosing performance shortfalls of a mobile communication device and providing a recommended remediation action. The method comprises collecting performance information by a diagnostic client application executing on a mobile communication device, where the performance information is related to a performance of the mobile communication device, transmitting the performance information by the diagnostic client application via a radio transceiver of the mobile communication device to a diagnostic server application executing on a computer system separate from the mobile communication device, analyzing the performance information by the diagnostic client application, based on analyzing the performance information, determining by the diagnostic client application that an action trigger criteria matches at least some of the performance information, and, based on the match between performance information and the action trigger criteria, performing a remediation action defined for the action trigger criteria.

20 Claims, 8 Drawing Sheets

(56) References Cited

U.S. PATENT DOCUMENTS

| | | | | |
|---|---|---|---|---|
| 8,855,627 B2* | 10/2014 | Ding | ................ | H04W 24/00 370/310.2 |
| 8,996,916 B2* | 3/2015 | Huang | ................ | G06F 11/0748 714/27 |
| 9,439,081 B1* | 9/2016 | Knebl | ................ | H04W 16/18 |
| 2006/0234698 A1* | 10/2006 | Fok | ................ | H04L 43/00 455/425 |
| 2012/0290870 A1* | 11/2012 | Shah | ................ | G06F 21/10 714/4.11 |

OTHER PUBLICATIONS

Contino, Jeff, et al., Patent Application entitled, "Evaluation of Mobile Device State and Performance Metrics for Diagnosis and Troubleshooting of Performance Issues", filed on Oct. 18, 2012, U.S. Appl. No. 13/655,333.

* cited by examiner

MOBILE COMMUNICATION DEVICE DIAGNOSTIC CLIENT AND ERROR REMEDIATION SHARING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices have become integrated into the daily lives of most US citizens. Wireless communication service coverage has become nearly ubiquitous. A wide variety of different brands and models of wireless communication devices are in service day-to-day and may communicate according to a number of different wireless communication protocols that remain in use. Problems with these devices or sub-optimal use of devices by users can degrade the performance of these devices and diminish their utility to users.

SUMMARY

In an embodiment, a method of diagnosing performance shortfalls of a mobile communication device and providing a recommended remediation action is disclosed. The method comprises collecting performance information by a diagnostic client application executing on a mobile communication device, where the performance information is related to a performance of the mobile communication device and transmitting the performance information by the diagnostic client application via a radio transceiver of the mobile communication device to a diagnostic server application executing on a computer system separate from the mobile communication device. The method further comprises receiving action trigger criteria-remediation pairs from the diagnostic server application, where the trigger criteria-remediation pairs are determined by the diagnostic server application based on analyzing performance information transmitted to the diagnostic server application by mobile communication devices. The method further comprises analyzing the performance information by the diagnostic client application. The method further comprises, based on analyzing the performance information, determining by the diagnostic client application that an action trigger criteria identified in one of the received action trigger criteria-remediation pairs matches at least some of the performance information and, based on the match between performance information and the action trigger criteria, performing a remediation action defined for the action trigger criteria.

In another embodiment, a method of diagnosing performance shortfalls of a mobile communication device and providing a recommended remediation action is disclosed. The method comprises analyzing performance information collected by a plurality of mobile communication devices by a diagnostic application executing on a computer system, and, based on analyzing the performance information, identifying event data patterns in the performance information by the diagnostic application, where at least some of the event data patterns are associated with a particular brand and model of mobile communication device. The method further comprises, based on analyzing remediation reports associated with the performance information, identifying at least one remediation recommendation for at least one event data pattern by the diagnostic application and transmitting a remediation recommendation and a corresponding definition of an action trigger criteria by the diagnostic application to a plurality of mobile communication devices of a brand and model associated with the event data pattern, where the action trigger criteria comprises the event data pattern.

In yet another embodiment, a method of diagnosing performance shortfalls of a mobile communication device and providing a recommended remediation action is disclosed. The method comprises analyzing performance information collected by a plurality of mobile communication devices by a diagnostic application executing on a computer system, based on analyzing the performance information, identifying a provisional event data pattern in the performance information associated with some of the mobile communication devices of a particular brand and model of mobile communication device by the diagnostic application, and sending by the diagnostic application a request to capture and return custom specified performance information related to the provisional event data pattern to mobile communication devices of the particular brand and mode of mobile communication device. The method further comprises analyzing by the diagnostic application performance information collected and returned by the mobile communication devices of the particular brand and mode of mobile communication device in response to the request to capture and return custom specified performance information, based on analyzing the information collected in response to the request to capture and return the custom specified performance information, validating the provisional event data pattern as an event data pattern by the diagnostic application, and transmitting a remediation recommendation and a corresponding definition of an action trigger criteria to the mobile communication devices of the particular brand and model, where the action trigger criteria comprises the event data pattern.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
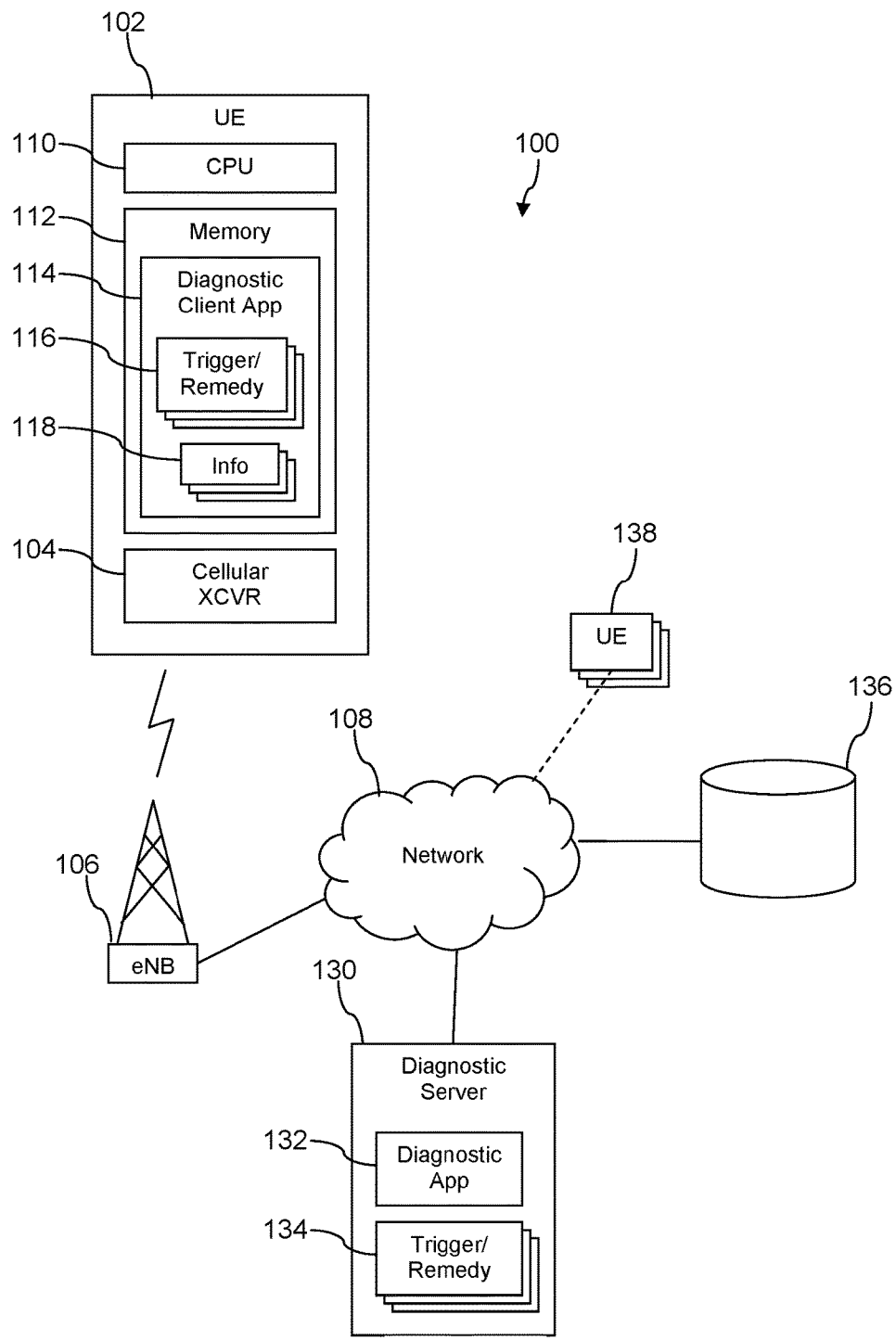
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a mobile communication device diagnostic and remediation system that involves cooperation and interaction between a diagnostic client on the mobile device and a diagnostic application executing on a computer system in a wireless communication service provider network. The diagnostic client monitors activity and events on the mobile device. The diagnostic client transmits at least some of this collected information back to a data store in the provider network, and the diagnostic application executing on the provider computer system analyzes this data to identify patterns of events that may be used as proxies or signatures of a troubled state of the device and to determine a suggested remediation for the troubled state. The diagnostic application can then send out this event pattern trigger and remediation suggestion pair to diagnostic clients on a plurality of mobile communication devices, thereby configuring those diagnostic clients to self-detect the pattern of events as the troubled state and to apply the suggested remediation to overcome the troubled state. The diagnostic client can detect when monitored events and performance data match a pre-defined event pattern trigger or action trigger criteria and execute a remediation action associated with the action trigger criteria.

Under some conditions, the diagnostic application on the computer system can command a diagnostic client on one or more mobile communication devices to collect custom specified information and to send that collected information to the data store for analysis by the diagnostic application. For example, a first mobile communication device of a specific brand and model may send back information in which the diagnostic application identifies a pattern of events associated with a troubled state of that device. The diagnostic application may provisionally infer that the pattern of events is indicative of the troubled state, but lacks enough data from a plurality of devices of the same brand and model to make a firm conclusion (e.g., the diagnostic application does not want to prematurely generalize the pattern of events to an action trigger criteria-remediation pair to be promulgated to a large number of devices). The request for the custom specified information may be directed to accumulating enough diagnostic data to confirm the provisionally identified event pattern association to the troubled state. If analysis by the diagnostic application of the requested information returned by the devices confirms the event pattern nexus to the troubled state, the diagnostic application may deem the association of the event pattern to the troubled state, define an action trigger criteria-remediation recommendation pair, and send the action trigger criteria-remediation recommendation pair out to a plurality of devices of the same brand and model to be configured into their diagnostic clients.

Event patterns may involve a plurality of events that, when occurring together (e.g., at about the same time), imply that an undesirable device state or poor device performance is being experienced by the device user. One event pattern may be frequent loss of GPS connectivity and frequent loss of data connectivity and a specific brand and model of mobile communication device. This specific event pattern may be an event signature or proxy for a known bad radio chip that is manufactured into that specific brand and model of mobile communication device. A remediation action may be to replace a $9 radio chip on the device. In an embodiment, the diagnostic client application of this specific brand and model of mobile communication device may be preconfigured to detect the event pattern of frequent loss of GPS connectivity and frequent loss of data connectivity and to associate this event pattern to a remediation action of presenting a message on a display of the device identifying the presumed source of the poor performance (i.e., the faulty radio chip), recommending in the message to ship the phone to the service provider to have the radio chip replaced, and providing further details on how to ship the phone for this service.

Another event pattern may be installation of one or more high memory storage consumption applications on the device and slow web page updates or slow data transmissions and a specific brand and model of mobile communication device. This specific event pattern may be an event signature or proxy for excessive memory use. A remediation action may be to upgrade the device to a different mobile communication device having more memory, buying and installing expansion memory on the device, unloading one or more of the applications from the device. It is understood that other event patterns are contemplated by the present disclosure. Further, it is understood that the diagnostic application is configured to synthesize event patterns and provisional event patterns based on automatic analysis of event data transmitted to the data store by diagnostic client applications and to identify one or more remediation actions to associate to the confirmed event patterns.

The diagnostic application may detect an event pattern on a specific instance of a mobile communication device and send a command to the diagnostic client application on that device to execute a pre-loaded diagnostic routine to attempt to further identity a source of a performance issue. For example, the diagnostic application may send a command to the diagnostic client application to play a predefined audio through an ear speaker of the device and to receive audio emitted by the speaker by the microphone of the device. By comparing the known audio signal to the audio signal received by the microphone of the device, the diagnostic application may troubleshoot the microphone of the device and determine that it has been damaged. The diagnostic application then can command the diagnostic client to present a message to a user of the device indicating the damage to the microphone (possibly incurred from dropping the device) and providing information about how to send the device to a repair center for repair. Alternatively, the diagnostic application can compare audio received from different mobile communication devices of the same brand and model, for example audio provided to an on-device voice recognition interface, to determine if the microphone of one device is receiving audio poorly relative to the community of like devices.

The diagnostic client application can detect that a user often swipes the device screen multiple times before the device responds to the swiping. This event pattern may be identified in an action trigger criteria associated to a remediation action of querying the user of the device if the device screen is cracked. If the user confirms the screen is cracked, the remediation action can further indicate that the problem with multiple swipes results from the cracked screen and providing information on how the user can get the screen replaced to resolve the multi-swipe problem.

While several explicit examples of event pattern being identified and articulated as action trigger criteria-remediation action pairs have been discussed, it will be appreciated that the diagnostic application is designed to automatically identify event patterns, formulate action trigger criteria-remediation action pairs, and promulgate these to appropriate mobile communication devices. The identification of event patterns may be conducted by searching for correlations of data values. For example, a plurality of instances of devices suffering degraded or failed performance may be identified. The performance data and other information associated with those specific devices may be collected and analyzed to determine correlation between data states and the problem performance. The correlation may further be tested by looking at data from other devices that have not experienced the performance problem to see if they do not generally exhibit the same event pattern as the poorly performing devices.

The mobile communication device diagnostic and remediation system taught herein supports quicker remediation of device problems than is possible in a centralized diagnosis system. This system also reduces network traffic relative to an alternative system based on a centralized diagnosis and remediation system. While some processing is done in the diagnostic and remediation system taught herein, it is noted that this processing is to generate action trigger criteria-remediation pairs to be sent out to mobile communication devices. Once these devices are provisioned and/or updated with action trigger criteria-remediation pairs, the mobile device clients executing on the mobile communication devices can self-diagnose and pursue remediation without resorting to a central authority. It is also worth noting that this capacity for self-diagnosis and remediation can make the mobile communication devices able to remediate problems even when the network is experiencing heavy traffic (while in a centralized diagnosis system the diagnosis and remediation would likely be delayed and even contribute to the network traffic congestion).

In some cases, the server diagnostic application may include network performance information along with device performance information in analyzing event patterns that constitute proxies or signatures of a troubled mobile communication device state, and action trigger criteria-remediation pairs may include both mobile communication device performance information as well as network performance information in the trigger criteria. In this way, the mobile communication device may be able to self-diagnose a performance problem based not only on device specific events and conditions but additionally network events and conditions.

Turning now to FIG. 1, a communication system 100 is described. In an embodiment, the system 100 comprises a mobile communication device (user equipment—UE) 102, having a cellular radio transceiver 104 that can establish a wireless communication link with a cell site (eNB) 106 according to one of a long term evolution (LTE), a code division multiple access (CDMA), a global system for mobile communication (GSM), or a worldwide interoperability for microwave access (WiMAX) wireless communication protocol. The mobile communication device 102 is one of a mobile phone, a smart phone, a personal digital assistant (PDA), a wearable computer, a headset computer, a media player, a laptop computer, a notebook computer, or a tablet computer. When the cellular radio transceiver 104 is wirelessly coupled to the cell site 106, the cell site 106 may communicatively couple the cellular radio transceiver 104 and/or the mobile communication device 102 to a network 108. The network 108 may comprise one or more private networks, one or more public networks, or a combination thereof. The mobile communication device 102 may perform voice calls and/or data sessions via the network 108. While FIG. 1 illustrates a single mobile communication device 102 and a single cell site 106, the system 100 may comprise any number of devices 102 and cell sites 106. The mobile communication devices 138 connected to the network 108 by a dotted line in FIG. 1 is intended to represent this plurality of other mobile communication devices linked (or sometimes not linked) by a plurality of cell sites 106 to the network 108.

The mobile communication device 102 further comprises a processor 110 and a memory 112. The memory 112 comprises a portion that may be referred to as non-transitory memory, meaning data and/or instructions (i.e., executable firmware, software, computer programs, and/or scripts) remain stored in that non-transitory memory after the device is powered off. The non-transitory portion of memory 112 stores a diagnostic client application 114 that comprises one or more action trigger criteria-remediation action pairs 116 and device performance information 118. While drawn within the box representing the diagnostic client application 114, the trigger-remedy pairs 116 and the information 118 may be stored in the memory outside of the block of memory containing the instructions of the diagnostic client application 114.

The diagnostic client application 114 monitors events and conditions on the device 102 and may compare these events and conditions to predefined action trigger criteria-remediation action pairs 116. The action trigger criteria-remediation action pairs 116 identify an event pattern that constitutes the trigger criteria. Said in other words, if an event pattern on the device 102 observed by the diagnostic client application 114 matches the trigger within boundaries defined in the criteria, action by the diagnostic client application 114 is triggered. In an embodiment, the remediation action may be explicitly defined in the trigger/remedy pair 116. Alternatively, in an embodiment, the remediation action may be referenced or pointed to by the remediation component of the trigger/remedy pair 116, and the explicit remediation action may be stored elsewhere, for example as subroutines, methods, scripts, or other blocks of instructions within the diagnostic client application 114 or outside of the diagnostic client application 114 elsewhere in a non-transitory portion of the memory 112. Some of the trigger/remedy pairs 116 may be loaded into the device 102 at the time of manufacturing. Some of the trigger/remedy pairs 116 may be loaded into the device 102 by a diagnostic server 130 that is communicatively coupled to the network 108. For example, the diagnostic server 130 may transmit a packet of update information over-the-air to the device 102 and/or devices 138.

The diagnostic server 130 is a computer system that executes a diagnostic application 132 and stores action trigger criteria-remediation action pairs 134 that it generates. The system 100 further comprises a data store 136 that contains performance information and other information transmitted by the diagnostic client application 114 executing on devices 102 and devices 138 to the data store 136. In an embodiment, the diagnostic application 132 may store the action trigger criteria-remediation action pairs 134 in the data store 136. Computer systems are described further hereinafter.

The performance information 118 collected by the diagnostic client application 114 on the mobile communication devices 102, 138 may comprise information about how long it takes for web pages to download to the device and render on a display of the device, how long it takes data to be transmitted to and/or from the device, a battery temperature, a screen swiping responsiveness of the device, a memory utilization of the device, an installation of applications on the device. The performance information 118 may further comprise an indication of how many pictures and a file size of the pictures stored in in the memory of the device 102, 138. The performance information 118 may comprise information about data connection disconnections and GPS receiver disconnections (loss of satellite signal). The performance information 118 may comprise device location information. The performance information 118 may comprise diagnostic test result information, for example result information captured during a diagnostic test initiated by the diagnostic application 132.

The diagnostic application 132 analyzes performance information and other data provided by the devices 102, 138 to the data store 136 to identify event patterns and to determine a remediation action to associate with an event pattern. The data store 136 may store remediation actions or remediation reports associated with specific mobile communication devices 102, 138, and the diagnostic application 132 may link these remediation actions to the event patterns, for example, associating action trigger criteria to corresponding remediation actions. The remediation actions or remediation reports identify an action or a sequence of actions that are taken to remedy an undesired performance or behavior of the mobile communication device 102, 138. Remediation actions may comprise changing or recommending changing a setting on a camera to generate smaller (e.g., lower number of pixels, lower resolution) picture files; deleting or recommending deleting some applications from the device 102, 138; sending the phone in for repair or recommending sending the phone in for repair (e.g., to replace a cracked screen, to repair a damaged microphone); recommending upgrading the device 102, 138 to a more highly capable device. The remediation actions or remediation reports stored in the data store 136 may comprise a result such as success, failure, or unknown. Alternatively, in an embodiment, an administrator, an engineer, or a customer care worker may manually associate remediation actions to event patterns and/or action trigger criteria.

Figure 2:
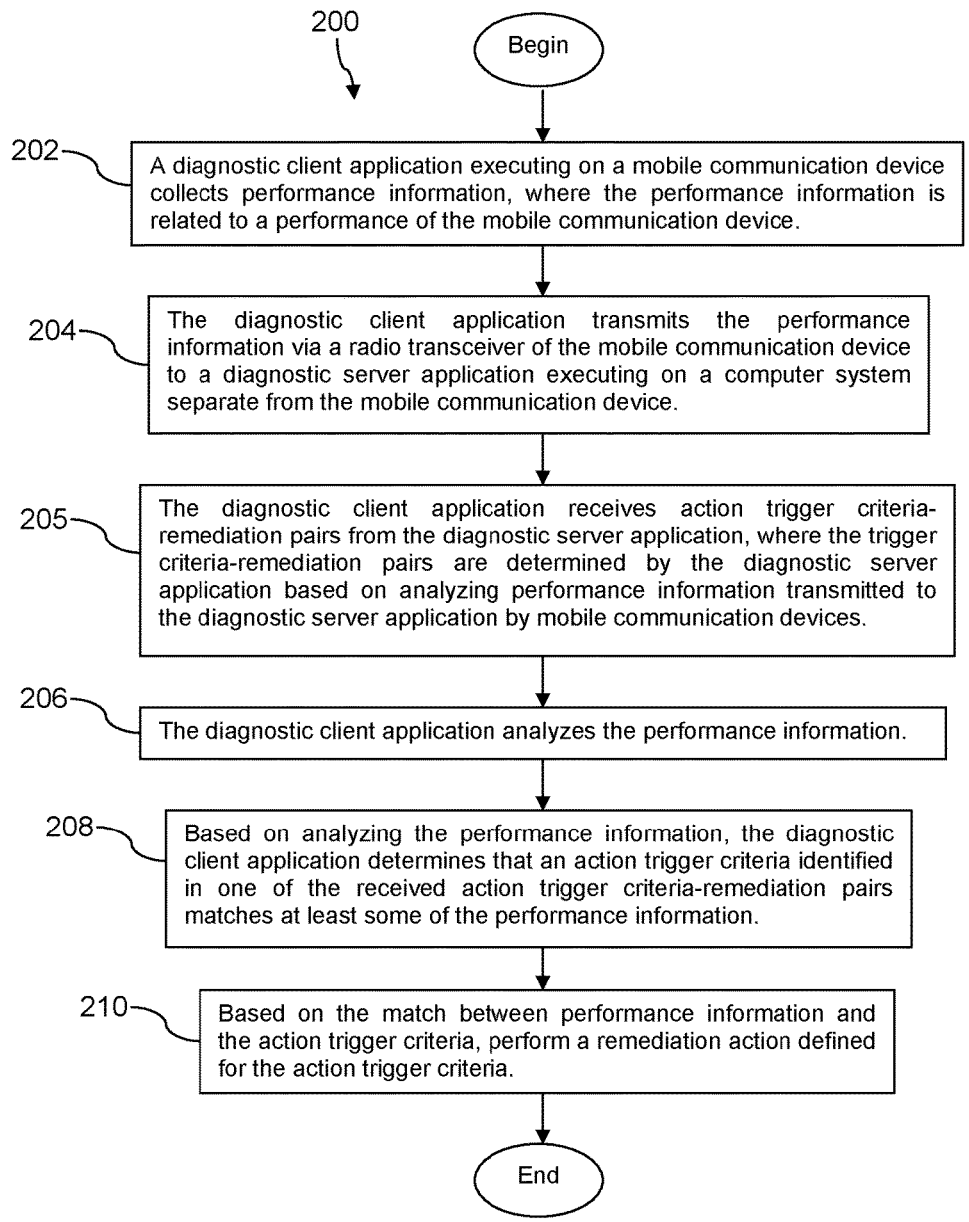
FIG. 2 is a flow chart of a method according to an embodiment of the disclosure.

Turning now to FIG. 2, a method 200 is described. At block 202, a diagnostic client application executing on a mobile communication device collects performance information, where the performance information is related to a performance of the mobile communication device. The performance information may comprise information unrelated directly to performance, for example location of the mobile communication device, day of week, and time. The performance information may comprise how long it takes for web pages to download to the device, how long it takes data to be transmitted by or received by the device, a battery temperature of the device, a memory utilization of the device, an identification of one or more applications installed on the device, a number of picture files stored in the memory and the file size of the pictures stored in the memory of the device, a number and/or rate of data connection disconnections, a number and/or rate of GPS receive disconnects (loss of satellite signal). The performance information may comprise diagnostic test results, for example result information captured during a diagnostic test executed on the device. At block 204, the diagnostic client application transmits the performance information via a radio transceiver of the mobile communication device to a diagnostic server application executing on a computer system separate from the mobile communication device. In an embodiment, the diagnostic client application transmits the performance information indirectly to the diagnostic server application, wherein the diagnostic client application sends the performance information directly to the data store 136 and the diagnostic application 132 reads the performance information from the data store 136. At block 205, the diagnostic client application receives action trigger criteria-remediation pairs from the diagnostic server application, where the trigger criteria-remediation pairs are determined by the diagnostic server application based on analyzing performance information transmitted to the diagnostic server application by mobile communication devices. For example, the diagnostic application 132 executing on the diagnostic server computer 130 analyzes performance information it receives from the diagnostic client application 114 executing on the mobile communication device 102 and from other diagnostic client applications executing on other mobile communication devices and identifies patterns of association between events and conditions whereby it autonomously builds action trigger criteria-remediation pairs.

At block 206, the diagnostic client application analyzes the performance information. It is understood that the processing of block 206 may be decoupled from the processing of block 204. Said in other words, the processing of block 206 may occur after the processing of block 204, before the processing of block 204, or at about the same time as the processing of block 204. At block 208, based on analyzing the performance information, the diagnostic client application determines that an action trigger criteria matches at least some of the performance information. For example, the diagnostic client application determines that an action trigger criteria identified in one of the received action trigger criteria-remediation pairs received from the diagnostic server application matches at least some of the performance information collected by the diagnostic client executing on the mobile communication device. At block 210, based on the match between performance information and the action trigger criteria, perform a remediation action defined for the action trigger criteria. For example, the diagnostic client application 114 finds a trigger/remedy pair 116 whose action trigger criteria is satisfied (i.e., the event trigger identified in the action trigger criteria matches the collected performance information within boundaries or tolerances specified by the criteria) and executes the remediation action defined in or referenced by the remediation action component of the trigger/remedy pair 116.

Figure 3:
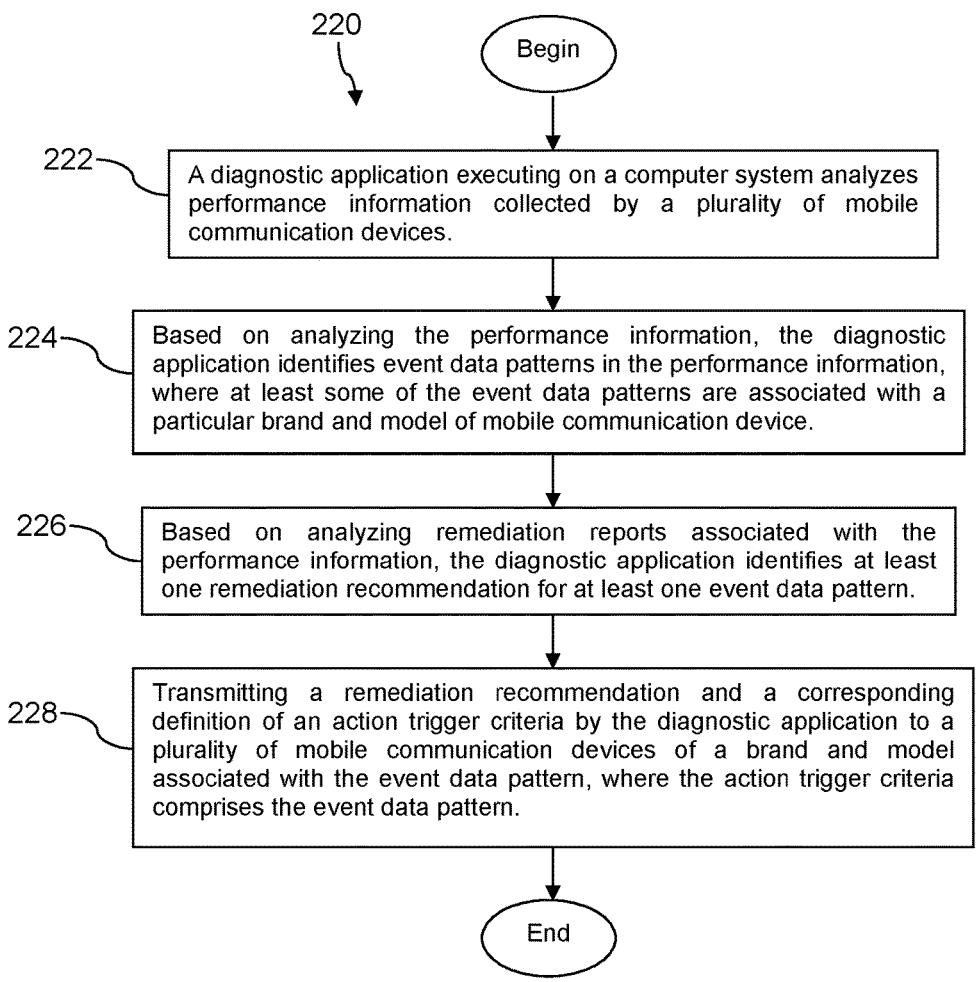
FIG. 3 is a flow chart of another method according to an embodiment of the disclosure.

Turning now to FIG. 3, a method 220 is described. At block 222, a diagnostic application executing on a computer system analyzes performance information collected by a plurality of mobile communication devices. The performance information may comprise information unrelated directly to performance, for example location of the mobile communication device, day of week, and time. The performance information may comprise how long it takes for web pages to download to the device, how long it takes data to be transmitted by or received by the device, a battery temperature of the device, a memory utilization of the device, an identification of one or more applications installed on the device, a number of picture files stored in the memory and the file size of the pictures stored in the memory of the device, a number and/or rate of data connection disconnections, a number and/or rate of GPS receive disconnects (loss of satellite signal). The performance information may comprise diagnostic test results, for example result information captured during a diagnostic test executed on the device. At block 224, based on analyzing the performance information, the diagnostic application identifies event data patterns in the performance information, where at least some of the event data patterns are associated with a particular brand and model of mobile communication device.

At block 226, based on analyzing remediation reports associated with the performance information, the diagnostic application identifies at least one remediation recommendation for at least one event data pattern. Alternatively, an administrator, an engineer, or a customer care worker may manually associate remediation recommendations to event data patterns that are automatically identified by the diagnostic application. At block 228, transmitting a remediation recommendation and a corresponding definition of an action trigger criteria by the diagnostic application to a plurality of mobile communication devices of a brand and model associated with the event data pattern, where the action trigger criteria comprises the event data pattern. This may also be referred to as an action trigger criteria-remediation action pair, for example the action trigger criteria-remediation action pairs 116, 134.

Figure 4:
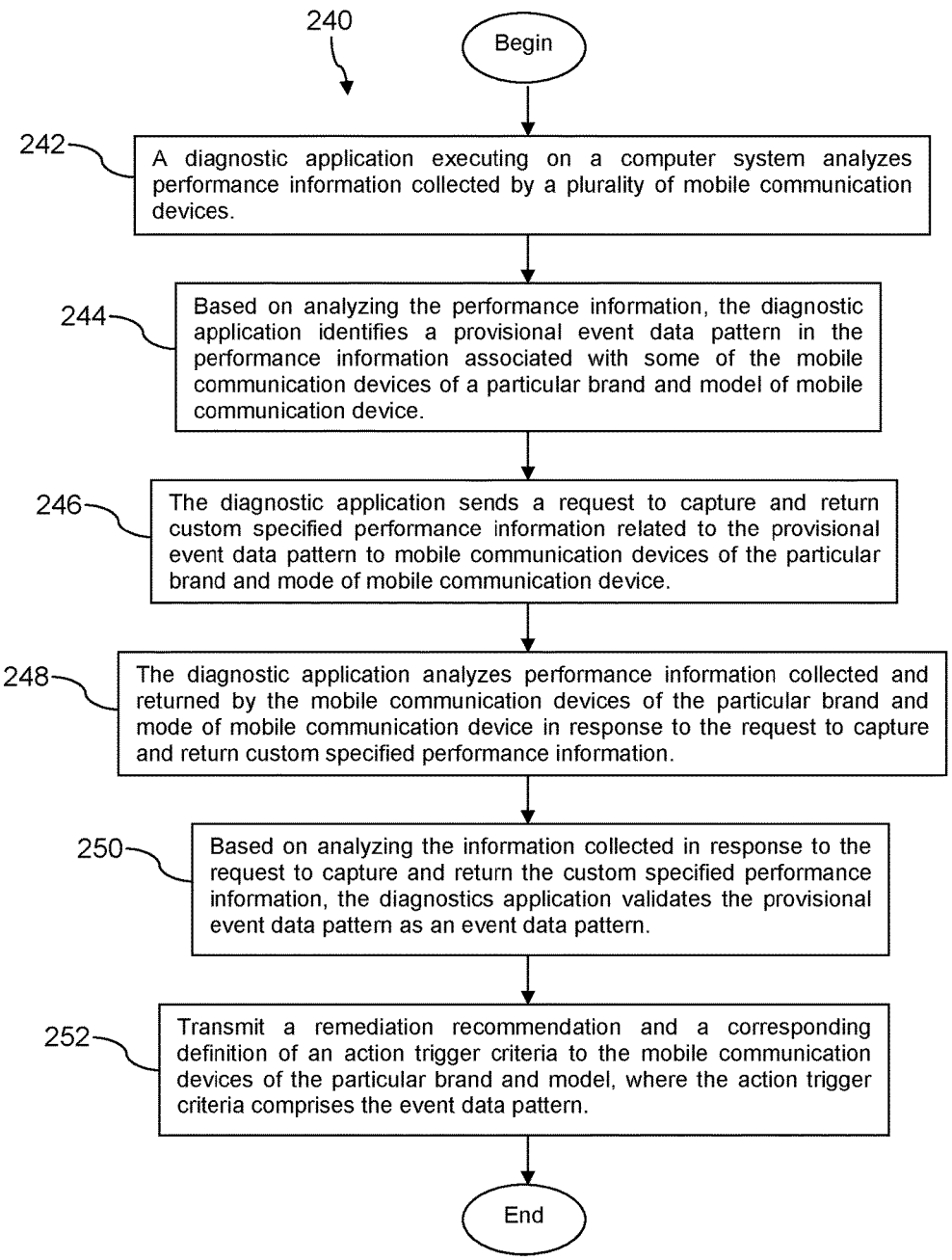
FIG. 4 is a flow chart of yet another method according to an embodiment of the disclosure.

Turning now to FIG. 4, a method 240 is described. At block 242, a diagnostic application executing on a computer system analyzes performance information collected by a plurality of mobile communication devices. The performance information may comprise information unrelated directly to performance, for example location of the mobile communication device, day of week, and time. The performance information may comprise how long it takes for web pages to download to the device, how long it takes data to be transmitted by or received by the device, a battery temperature of the device, a memory utilization of the device, an identification of one or more applications installed on the device, a number of picture files stored in the memory and the file size of the pictures stored in the memory of the device, a number and/or rate of data connection disconnections, a number and/or rate of GPS receive disconnects (loss of satellite signal). The performance information may comprise diagnostic test results, for example result information captured during a diagnostic test executed on the device.

At block 244, based on analyzing the performance information, the diagnostic application identifies a provisional event data pattern in the performance information associated with some of the mobile communication devices of a particular brand and model of mobile communication device. By "provisional event data pattern" is simply meant that the event data pattern has not yet been observed in a sufficient number of mobile communication devices 102 to be deemed a "pattern." One instance of a particular combination of events does not constitute a pattern; two instances of the particular combination of events probably does not constitute a pattern; ten thousand instances of the particular combination of events may indeed constitute a pattern. At block 246, the diagnostic application sends a request to capture and return performance information related to the provisional event data pattern to mobile communication devices of the particular brand and mode of mobile communication device. This performance information may be custom specified performance information related to the provisional event data pattern identified in the processing of block 244. Said in other words, the requested information may not be performance information which is customarily returned by the diagnostic client application 114 but may be different from the standard performance information in some way, for example by stipulating performance information which is not customarily collected or possibly by stipulating collecting an increased number of sample values of a standard item of performance information.

At block 248, the diagnostic application analyzes performance information collected and returned by the mobile communication devices of the particular brand and mode of mobile communication device in response to the request to capture and return custom specified performance information. At block 250, based on analyzing the information collected in response to the request to capture and return the custom specified performance information, the diagnostics application validates the provisional event data pattern as an event data pattern. At block 252, transmit a remediation recommendation and a corresponding definition of an action trigger criteria to the mobile communication devices of the particular brand and model, where the action trigger criteria comprises the event data pattern. This may also be referred to as an action trigger criteria-remediation action pair, for example the action trigger criteria-remediation action pairs 116, 134.

Figure 5:
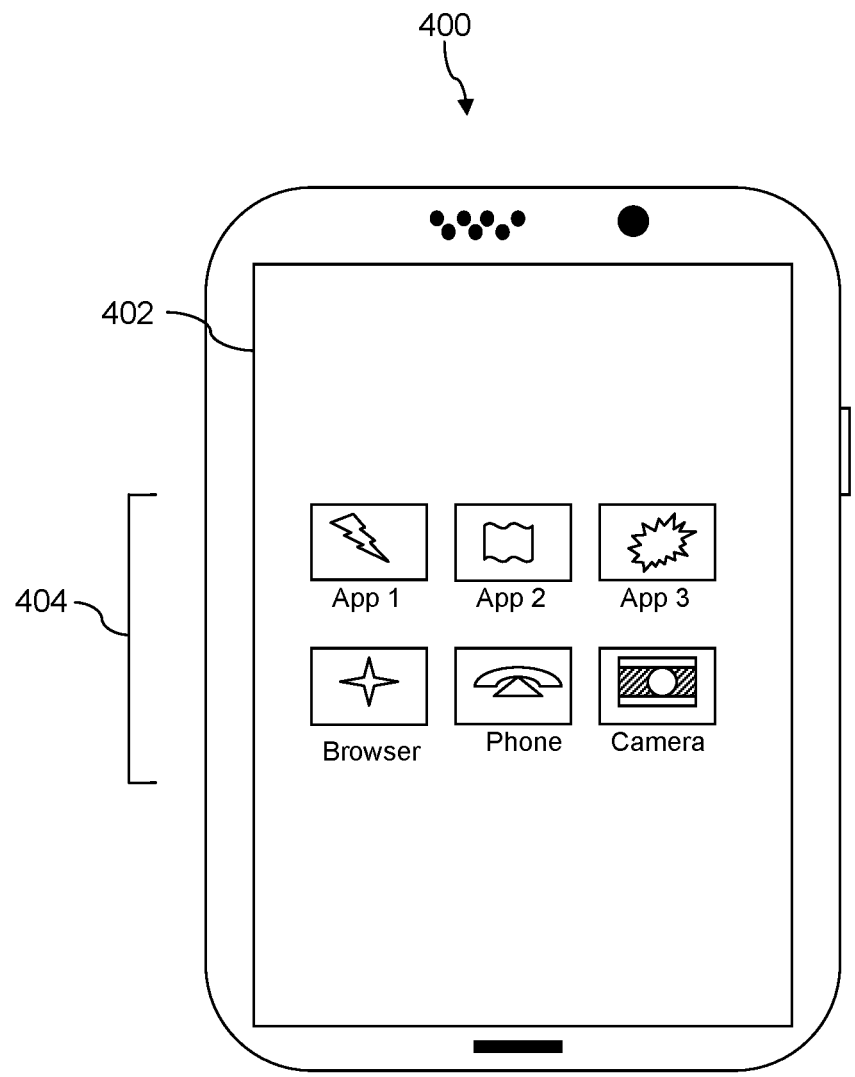
FIG. 5 is an illustration of a mobile communication device according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
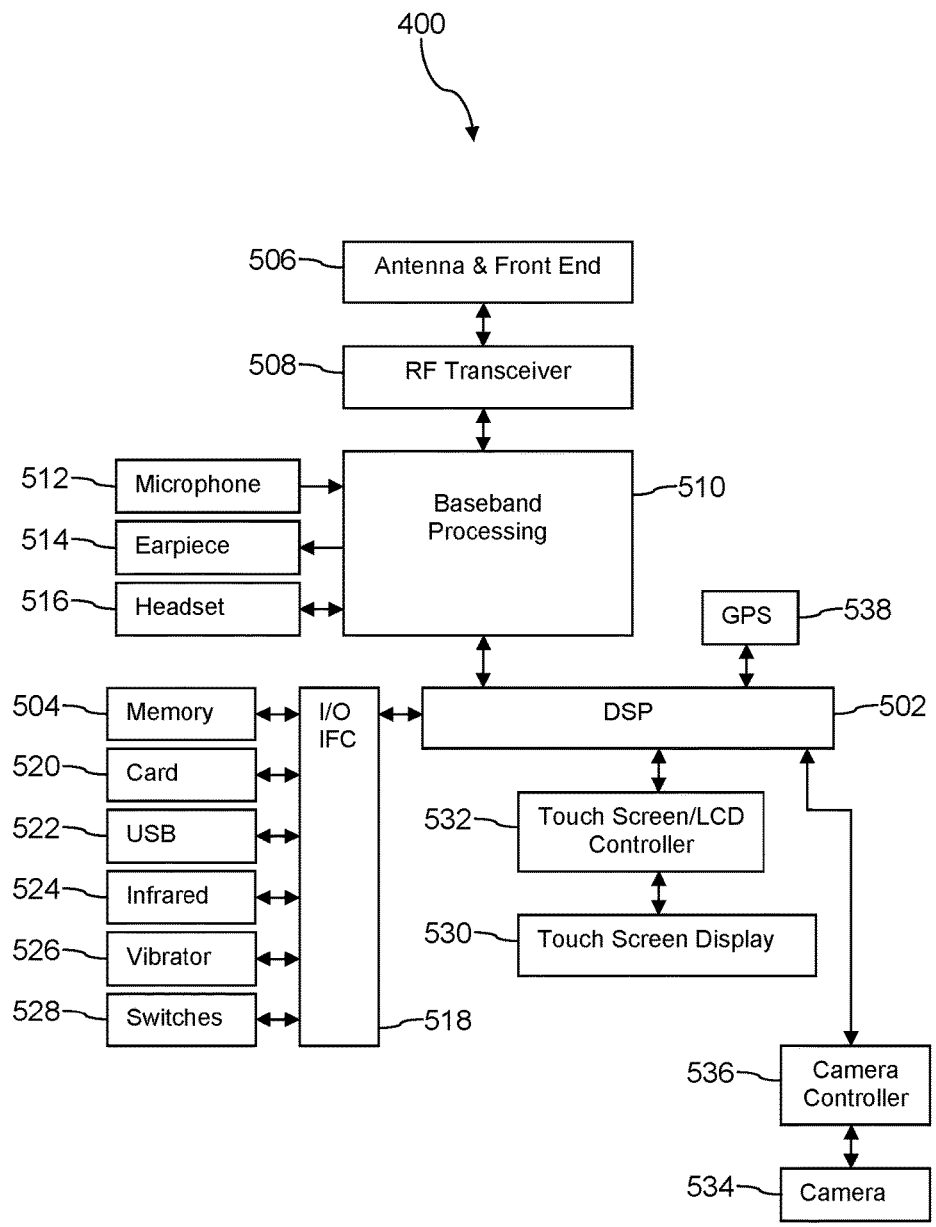
FIG. 6 is a block diagram of a hardware architecture according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
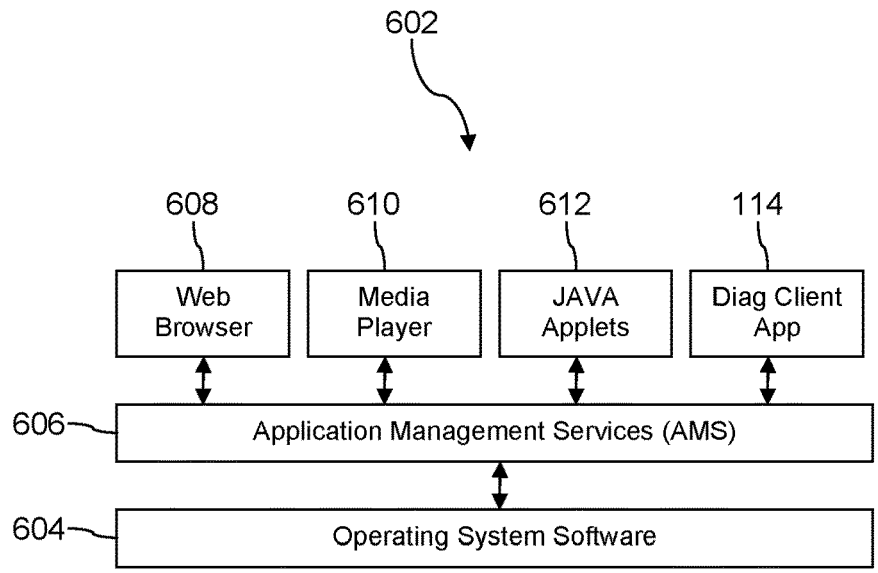
FIG. 7A is a block diagram of a software architecture according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612, and the diagnostic client application 114. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
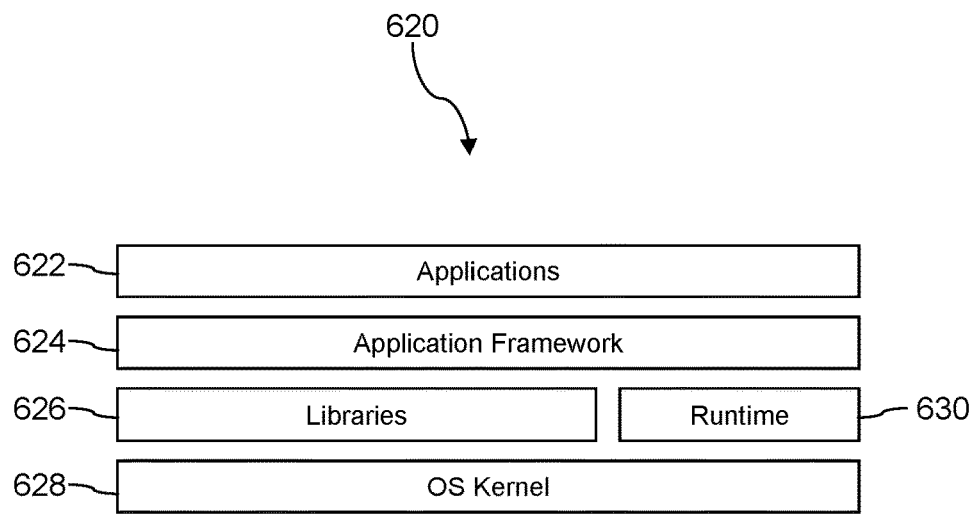
FIG. 7B is a block diagram of another software architecture according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
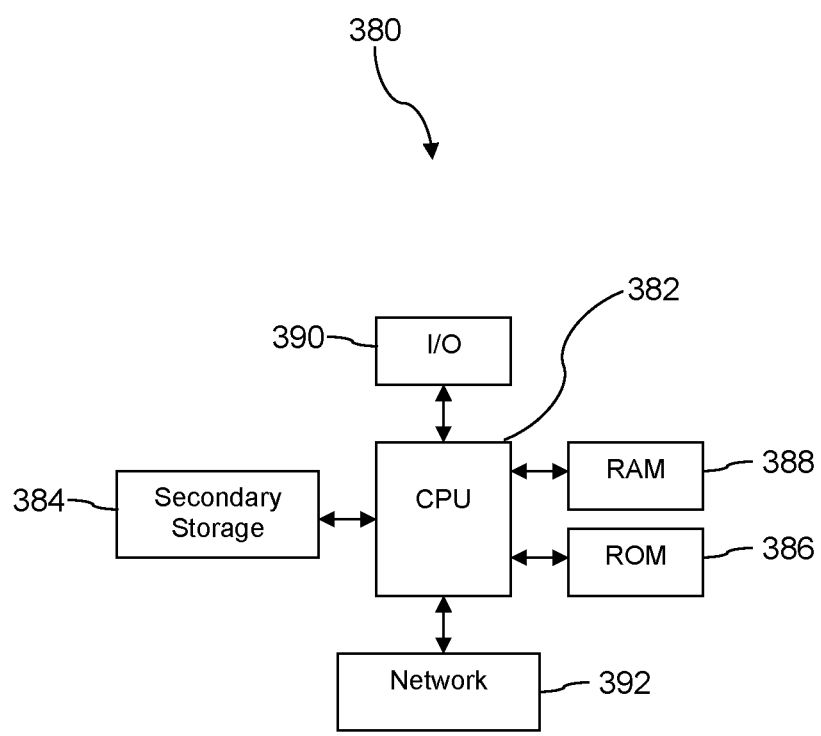
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of diagnosing performance shortfalls of a mobile communication device and providing a recommended remediation action, comprising:

collecting performance information by a diagnostic client application executing on a mobile communication device, where the collected performance information is related to a performance of the mobile communication device;

transmitting the collected performance information by the diagnostic client application via a radio transceiver of the mobile communication device to a diagnostic server application executing on a computer system separate from the mobile communication device;

receiving action trigger criteria-remediation pairs by the diagnostic client application from the diagnostic server application, where the trigger criteria-remediation pairs are determined by the diagnostic server application based on analyzing performance information of a plurality of mobile communication devices transmitted to the diagnostic server application by the plurality of mobile communication devices and identifying event data patterns in the performance information of the plurality of mobile communication devices;

analyzing the collected performance information by the diagnostic client application;

based on analyzing the collected performance information, determining by the diagnostic client application that an action trigger criteria identified in one of the received action trigger criteria-remediation pairs matches at least some of the collected performance information; and based on the match between the at least some of the collected performance information and the action trigger criteria, performing a remediation action defined for the action trigger criteria.

2. The method of claim 1, wherein the mobile communication device is one of a mobile phone, a smart phone, a personal digital assistant (PDA), a wearable computer, a headset computer, a media player, a laptop computer, a notebook computer, or a tablet computer.

3. The method of claim 2, wherein the mobile communication device can establish a wireless communication link with a cell site according to one of a long term evolution (LTE), a code division multiple access (CDMA), a global system for mobile communication (GSM), or a worldwide interoperability for microwave access (WiMAX) wireless communication protocol.

4. The method of claim 1, wherein the collected performance information comprises how long it takes for web pages to download to the mobile communication device, how long it takes data to be transmitted by or received by the mobile communication device, a battery temperature of the mobile communication device, a memory utilization of the mobile communication device, an identification of one or more applications installed on the mobile communication device, a number of picture files stored in the memory and the file size of the pictures stored in the memory of the mobile communication device, a rate of data connection disconnections, and a rate of GPS receive disconnects.

5. The method of claim 1, wherein the collected performance information comprises diagnostic test results, where the results are associated with a diagnostic test executed on the mobile communication device.

6. The method of claim 1, wherein the collected performance information comprises device location, date, and time.

7. The method of claim 1, wherein the remediation performed is to present a message recommending replacement of a radio chip of the mobile communication device.

8. A method of diagnosing performance shortfalls of a mobile communication device and providing a recommended remediation action, each step of the method performed by a diagnostic application executing on a computer system, the method comprising:
- analyzing performance information collected by a plurality of mobile communication devices;
- based on analyzing the performance information of the plurality of mobile communication devices, identifying event data patterns in the performance information of the plurality of mobile communication devices, where at least some of the event data patterns are associated with a particular brand and model of mobile communication device;
- based on analyzing remediation reports associated with the performance information of the plurality of mobile communication devices, identifying at least one remediation recommendation for at least one event data pattern associated with the particular brand and model of mobile communication device;
- define an action trigger criteria-remediation pair for the particular brand and model of mobile communication device based on the analysis of the performance information of the plurality of mobile communication devices and the analysis of the remediation reports; and
- transmitting the defined action trigger criteria-remediation pair comprising a remediation recommendation and a corresponding definition of an action trigger criteria to a plurality of mobile communication devices of the particular brand and model associated with the event data pattern, where the action trigger criteria comprises the event data pattern.

9. The method of claim 8, wherein each of the plurality of mobile communication devices is one of a mobile phone, a smart phone, a personal digital assistant (PDA), a wearable computer, a headset computer, a media player, a laptop computer, a notebook computer, or a tablet computer.

10. The method of claim 8, wherein one remediation recommendation is changing a resolution setting of a camera of a mobile communication device and a corresponding definition of an action trigger is a number of picture files above a threshold number stored on the mobile communication device.

11. The method of claim 8, wherein one remediation recommendation is sending a mobile communication device to have a screen replaced and a corresponding definition of an action trigger is a pattern of multiple swipes to transmit a swipe input to the mobile communication device.

12. The method of claim 8, wherein one remediation recommendation is deleting applications from a mobile communication device and a corresponding definition of an action trigger is a pattern of slow web page downloads and slow data reception.

13. The method of claim 8, wherein one remediation recommendation is sending a mobile communication device to have a radio chip replaced and a corresponding definition of an action trigger is a frequency of loss of connectivity of a GPS receiver and a frequency of loss of data connectivity and a specific identity of a brand and model of mobile communication device.

14. The method of claim 8, wherein the performance information of each mobile communication device of the plurality of mobile communication devices comprises how long it takes for web pages to download to the mobile communication device, how long it takes data to be transmitted by or received by the mobile communication device, a battery temperature of the mobile communication device, a memory utilization of the mobile communication device, an identification of one or more applications installed on the mobile communication device, a number of picture files stored in the memory and the file size of the pictures stored in the memory of the mobile communication device, a rate of data connection disconnections, and a rate of GPS receive disconnects.

15. A method of diagnosing performance shortfalls of a mobile communication device and providing a recommended remediation action, each step of the method performed by a diagnostic application executing on a computer system, the method comprising:
- analyzing performance information collected by a plurality of mobile communication devices;
- based on analyzing the performance information of the plurality of mobile communication devices, identifying a provisional event data pattern in the performance information associated with some of the plurality of mobile communication devices of a particular brand and model of mobile communication device;
- sending a request to capture and return custom specified performance information related to the provisional event data pattern to mobile communication devices of the particular brand and mode of mobile communication device;
- analyzing performance information collected and returned by the mobile communication devices of the particular brand and mode of mobile communication device in response to the request to capture and return custom specified performance information;
- based on analyzing the information collected in response to the request to capture and return the custom specified performance information, validating the provisional event data pattern as an event data pattern;
- define an action trigger criteria-remediation pair for the particular brand and model of mobile communication device based on the analysis of the performance information collected and returned by the mobile communication devices of the particular brand and mode of mobile communication device; and
- transmitting the defined action trigger criteria-remediation pair comprising a remediation recommendation and a corresponding definition of an action trigger criteria to the mobile communication devices of the particular brand and model, where the action trigger criteria comprises the event data pattern.

16. The method of claim 15, wherein the performance information of each mobile communication device of the plurality of mobile communication devices comprises how long it takes for web pages to download to the mobile communication device, how long it takes data to be transmitted by or received by the mobile communication device, a battery temperature of the mobile communication device, a memory utilization of the mobile communication device, an identification of one or more applications installed on the mobile communication device, a number of picture files stored in the memory and the file size of the pictures stored in the memory of the mobile communication device, a rate of data connection disconnections, and a rate of GPS receive disconnects.

17. The method of claim 16, wherein one remediation recommendation is deleting applications from a mobile communication device and a corresponding definition of an action trigger is a pattern of slow web page downloads and slow data reception.

18. The method of claim 15, wherein each of the plurality of mobile communication devices is one of a mobile phone, a smart phone, a personal digital assistant (PDA), a wearable computer, a headset computer, a media player, a laptop computer, a notebook computer, or a tablet computer.

19. The method of claim 18, wherein one remediation recommendation is sending a mobile communication device to have a radio chip replaced and a corresponding definition of an action trigger is a frequency of loss of connectivity of a GPS receiver and a frequency of loss of data connectivity and a specific identity of a brand and model of mobile communication device.

20. The method of claim 15, wherein one remediation recommendation is sending a mobile communication device to have a screen replaced and a corresponding definition of an action trigger is a pattern of multiple swipes to transmit a swipe input to the mobile communication device.

* * * * *